US009405908B2

(12) United States Patent
Saripalli

(10) Patent No.: US 9,405,908 B2
(45) Date of Patent: *Aug. 2, 2016

(54) SYSTEMS, METHODS, AND APPARATUS TO VIRTUALIZE TPM ACCESSES

(71) Applicant: Intel Corporation, Santa Clara, CA (US)

(72) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/843,063

(22) Filed: Mar. 15, 2013

(65) Prior Publication Data

US 2013/0298250 A1 Nov. 7, 2013

Related U.S. Application Data

(63) Continuation of application No. 12/793,579, filed on Jun. 3, 2010, now Pat. No. 8,959,363.

(51) Int. Cl.
*G06F 21/57* (2013.01)
*H04L 12/24* (2006.01)
(Continued)

(52) U.S. Cl.
CPC ............. *G06F 21/57* (2013.01); *G06F 21/606* (2013.01); *H04L 41/044* (2013.01); *H04L 63/10* (2013.01)

(58) Field of Classification Search
CPC ...................................................... G06F 21/57
See application file for complete search history.

(56) References Cited

U.S. PATENT DOCUMENTS

| 2004/0073806 | A1* | 4/2004 | Zimmer | G06F 21/575 713/189 |
| 2004/0111633 | A1* | 6/2004 | Chang | G06F 21/572 726/28 |
| 2005/0076155 | A1* | 4/2005 | Lowell | G06F 9/45537 710/1 |

(Continued)

FOREIGN PATENT DOCUMENTS

| CN | 1988534 A | 6/2007 |
| CN | 101477602 A | 7/2009 |

(Continued)

OTHER PUBLICATIONS

Stumpf et al.; Enhancing Trusted Platform Modules with Hardware-Based Virtualization Techniques; Published in: Emerging Security Information, Systems and Technologies, 2008. Securware '08. Second International Conference on; Date of Conference: Aug. 25-31, 2008; pp. 1-9; IEEE Xplore.*

(Continued)

*Primary Examiner* — Bradley Holder
(74) *Attorney, Agent, or Firm* — Vecchia Patent Agent, LLC

(57) ABSTRACT

Embodiments of system, method, and apparatus for virtualizing TPM accesses is described. In some embodiments, an apparatus including a CPU core to execute a software program, a manageability engine coupled to the CPU core, the manageability engine to receive a trusted platform module (TPM) command requested by the software program and to process the TPM command utilizing a manageability firmware by at least creating a TPM network packet, and a network interface coupled to the manageability engine to transmit the TPM network packet to a remote TPM that is external to the apparatus for processing is utilized as a part of this virtualization process.

8 Claims, 9 Drawing Sheets

(51) Int. Cl.
*H04L 29/06* (2006.01)
*G06F 21/60* (2013.01)

(56) References Cited

U.S. PATENT DOCUMENTS

| | | | | |
|---|---|---|---|---|
| 2005/0246525 | A1* | 11/2005 | Bade | G06F 21/57 713/164 |
| 2006/0095551 | A1 | 5/2006 | Leung et al. | |
| 2007/0239748 | A1* | 10/2007 | Smith | G06F 21/57 |
| 2007/0260545 | A1* | 11/2007 | Bade | G06F 21/575 705/51 |
| 2008/0046898 | A1* | 2/2008 | Molina | G06F 21/72 719/330 |
| 2008/0060068 | A1* | 3/2008 | Mabayoje | G06F 21/31 726/9 |
| 2008/0155277 | A1* | 6/2008 | Bulusu | G06F 21/57 713/193 |
| 2009/0031013 | A1* | 1/2009 | Kunchipudi | G06F 9/4416 709/222 |
| 2009/0044187 | A1* | 2/2009 | Smith | G06F 21/57 718/1 |
| 2009/0165117 | A1* | 6/2009 | Brutch | G06F 21/629 726/14 |
| 2009/0169020 | A1* | 7/2009 | Sakthikumar | G06F 21/57 380/278 |
| 2010/0241785 | A1* | 9/2010 | Chen | G06F 9/5016 711/6 |
| 2011/0153909 | A1* | 6/2011 | Dong | G06F 9/45558 711/6 |
| 2011/0246171 | A1* | 10/2011 | Cleeton | G06F 9/45558 703/25 |

FOREIGN PATENT DOCUMENTS

| | | | |
|---|---|---|---|
| CN | 101493870 | A | 7/2009 |
| JP | 2006501581 | A | 10/2003 |
| JP | 2008500651 | A | 1/2008 |
| JP | 2008165794 | A | 7/2008 |
| JP | 2011-122398 | A | 6/2011 |
| KR | 1020090065415 | A | 6/2009 |
| KR | 1020100031408 | A | 3/2010 |
| TW | 200604794 | A | 2/2006 |
| WO | 2008004524 | A1 | 1/2008 |
| WO | 2011153093 | A2 | 12/2011 |
| WO | 2011153093 | A3 | 3/2012 |

OTHER PUBLICATIONS

Dalton et al.; Trusted virtual platforms: a key enabler for converged client devices; Published in: Newsletter ACM SIGOPS Operating Systems Review archive vol. 43 Issue 1, Jan. 2009; pp. 36-43; ACM Digital Library.*
Trusted Computing Group; TCG PC Client Specific TPM Interface Specification (TIS); Version 1.2 Final, Revision 1.00, Jul. 11, 2005, for TPM Family 1.2 Level 2, pp. 1-70.
Office Action Received for Korean patent Application No. 10-2011-0054061, mailed on Oct. 25, 2012, 10 pages including 5 pages of English Translation.
Office Action Received for Taiwan Patent Application No. 100119623, mailed on Feb. 20, 2014, 14 pages including 7 pages of English Translation.
Notice of Grant received for Japanese Patent Application No. 2011-122398, mailed on Jul. 23, 2013, 6 pages including 3 pages of English Translation.
Office Action received for Japanese Patent Application No. 2011-122398, mailed on Jul. 23, 2013, 6 pages including 3 pages of English Translation.
Office Action received for Chinese Patent Application No. 201110161554.6, mailed on May 27, 2013, 20 pages including 11 pages of English Translation.
Office Action received for Chinese Patent Application No. 201110161554.6, mailed on Dec. 3, 2013, 18 pages including 9 pages of English Translation.
Office Action received for Chinese Patent Application No. 201110161554.6, mailed on Apr. 29, 2014, 20 pages including 10 pages of English Translation.
International Preliminary Report on Patentability and Written Opinion received for PCT Patent Application No. PCT/US2011/038350, mailed on Dec. 12, 2013.
International Search Report and Written Opinion received for PCT Patent Application No. PCT/US2011/038350, mailed on Feb. 9, 2012.
Office Action received for U.S. Appl. No. 12/793,579, mailed on Jun. 15, 2012, 26 pages.
Office Action received for U.S. Appl. No. 12/793,579, mailed on Nov. 5, 2012, 20 pages.
Notice of Allowance received for U.S. Appl. No. 12/793,579, mailed on Sep. 29, 2014, 12 pages.
Office Action received for Japanese Patent Application No. 2014-051190, mailed on Aug. 11, 2015, 2 pages of English Translation and 2 pages of Japanese Office Action.
Dalton, et al., "Trusted Virtual Platforms: A Key Enabler for Converged Client Devices", Published in: Newsletter ACM SIGOPS, Operating Systems Review archive, vol. 43, Issue 1, pp. 36-43.
Stumpf, et al., "Enhancing Trusted Platform Modules with Hardware-Based Virtualization Techniques", Published in: Second International Conference on Emerging Security Information, Systems and Technologies, IEEE, 2008, Securware '08, 9 pages

* cited by examiner

SYSTEMS, METHODS, AND APPARATUS TO VIRTUALIZE TPM ACCESSES

CROSS REFERENCE TO RELATED APPLICATION

This present application is a continuation of co-pending U.S. patent application Ser. No. 12/793,579, filed on Jun. 3, 2010, entitled, "Systems, Methods, and Apparatus to Virtualize TPM Accesses", which is incorporated herein by reference.

FIELD OF THE DISCLOSURE

This disclosure relates generally to the field of data processing and in particular to secured data processing.

BACKGROUND OF THE DISCLOSURE

The increasing number of financial and personal transactions being performed on local or remote microcomputers has given impetus for the establishment of "trusted" or "secured" microprocessor environments. The problem these environments try to solve is that of loss of privacy, or data being corrupted or abused. Users do not want their private data made public. They also do not want their data altered or used in inappropriate transactions. Examples of these include unintentional release of medical records or electronic theft of funds from an on-line bank or other depository. Similarly, content providers seek to protect digital content (for example, music, other audio, video, or other types of data in general) from being copied without authorization.

One component of such a trusted microprocessor system may be a trusted platform module (TPM), as disclosed in the TCG TPM Specification, Version 1.2.

BRIEF DESCRIPTION OF THE DRAWINGS

The present invention is illustrated by way of example and not limitation in the figures of the accompanying drawings.

DETAILED DESCRIPTION

The following description describes techniques of trusted execution. In the following description, numerous specific details such as logic implementations, software module allocation, and details of operation are set forth in order to provide a more thorough understanding of embodiments of the present invention. It will be appreciated, however, by one skilled in the art that embodiments of the present invention may be practiced without such specific details. In other instances, control structures, gate level circuits and full software instruction sequences have not been shown in detail in order not to obscure the embodiments of the present invention. Those of ordinary skill in the art, with the included descriptions, will be able to implement appropriate functionality without undue experimentation.

A data processing system may include hardware resources, such as a central processing unit (CPU), random access memory (RAM), read-only memory (ROM), etc. The processing system may also include software resources, such as a basic input/output system (BIOS), a virtual machine monitor (VMM), and one or more operating systems (OSs). When the computer system is started or reset, it may load the BIOS, and then the VMM. The VMM may run on top of a host OS, or the VMM may be implemented as a hypervisor that includes control which serves more or less as a host OS. The VMM may create one or more virtual machines (VMs), and the VMs may boot to different guest OSs or to different instances of the same guest OS. A guest OS that provides the VMM with facilities for managing certain aspects of the processing system pertaining to virtualization may be referred to as a service OS. The VMM may thus allow multiple OSs and applications to run in independent partitions.

The CPU in a data processing system may provide hardware support (e.g., instructions and data structures) for virtualization. Different types of processors may provide different features for supporting virtualization. A processing system may also include features referred to as LaGrande Technology (LT), or Intel® Trusted Execution Technology (TXT), as developed by Intel Corporation. The LT/Intel® TXT features may provide for the protected measurement and launching of a VMM. Different types of processors may provide different features to provide for the protected measurement and launching of a VMM.

Figure 1:
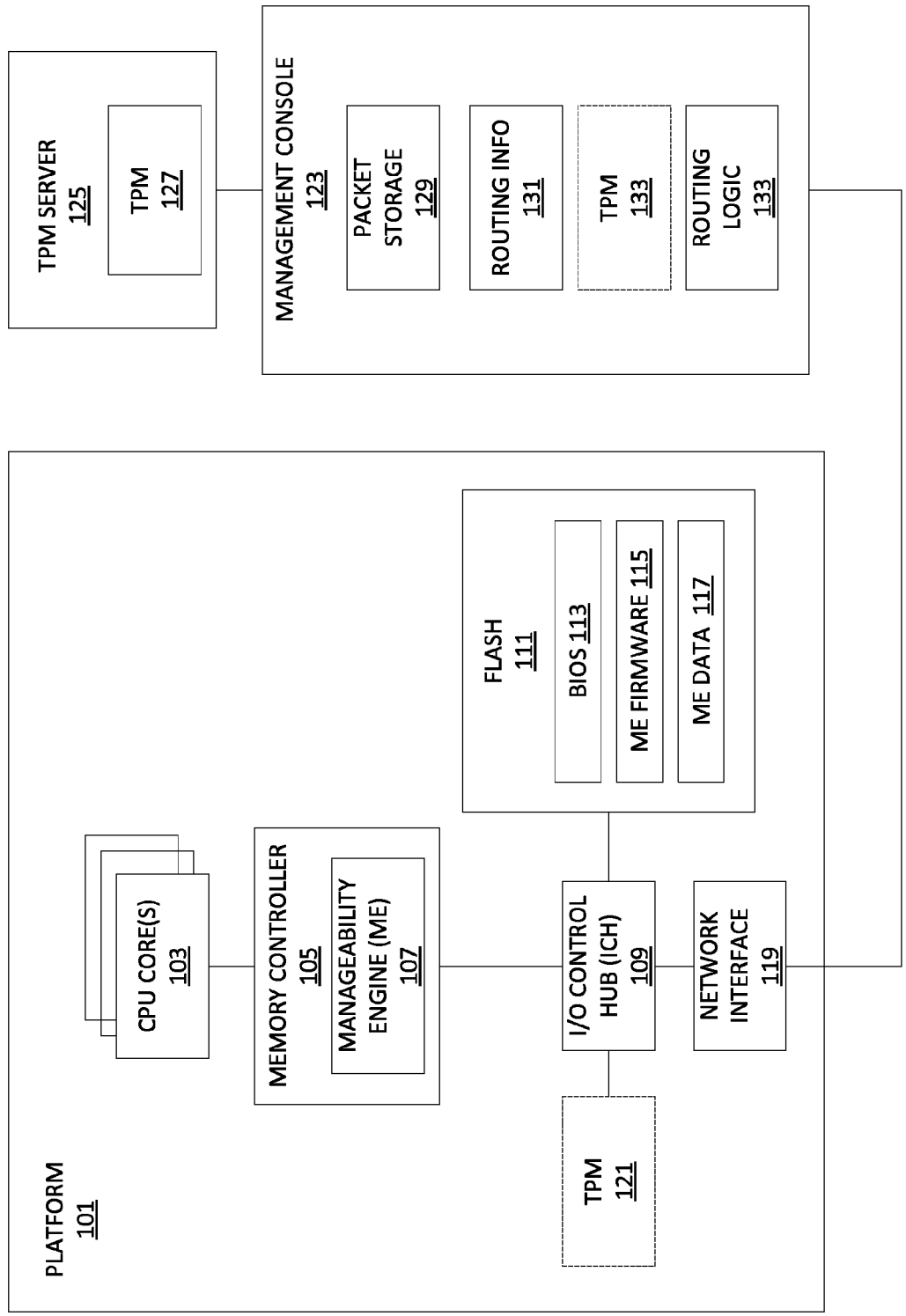
FIG. 1 illustrates a system for implementing trusted computing.

FIG. 1 illustrates a system for implementing trusted computing. In the illustrated example, this system is comprised of three main components: a computer (trusted platform) 101 (such as a desktop, laptop, netbook, etc.), a management console (MGMT console) 123, and a TPM server 125. However, in some embodiments, one or more of these components are merged (for example, the TPM server 125 and management console 123 would be one entity). In other embodiments, these components and their sub-components are spread across additional entities.

The computer 101 includes at least one CPU core 103 to execute software programs, by processing instructions, including those that would like to invoke trusted execution using a TPM. In some embodiments, the CPU core 103 executes instructions which generate a hash of at least a portion of the platform's 101 software including operating systems, applications, and virtual machines. The hash is stored locally in the TPM 121 if available or externally if not.

The CPU core 103 is coupled to a memory controller 105. In some embodiments, the memory controller 105 is on the same die as the CPU core 103 (an integrated memory controller). In other embodiments, the memory controller is external to the die housing the CPU core 103 (for example, in a northbridge).

The memory controller 105 also includes a manageability engine (ME) 107. The ME 107 is a microcontroller or other processor that executes the ME firmware 115. In an embodiment, ME 107 is a baseboard management controller (BMC). The ME 107 typically runs on auxiliary power and is available for most, if not all, power states. In another embodiment, a microcontroller ME is used in combination with a BMC.

The ME firmware 115 is stored in flash memory 111. Through the ME 107, ME firmware 115, and ME data storage 117, remote out-of-band (OBB) management of the computer 101 is available. For example, a remote application may perform platform setup and configuration. In an embodiment, the CPU including the core 103 has registers used to indicate if the coupled chipset can take advantage of the ME's 107 features secured computing features such as forwarding TPM commands. The ME firmware 115 executes on the ME 107 and may use a portion of RAM coupled to the CPU 103 for storage during execution. The ME firmware 115 performs one or more of: processing requests in the absence of a local TPM 121 as will be detailed later, acting as a storage manager of TPM requests (places and retrieves TPM request information into ME data storage 117 or other storage), tracking the DHCP leases of the OS by using dedicated filters in the network interface 119 (when the lease was acquired, when it will expire, etc.), interacting with the network interface 119 to maintain or acquire connections, reading the power state of the chipset and using this to determine when to shut itself down or power up (and in some embodiments, control the power of other components such as the ME 107 and ME data storage 113), store version numbers of software in ME data 117 or other non-volatile memory (such as anti-virus protection version), proactively block incoming threats (system defense), verify that desired software agents (such as anti-virus) are running and alert a management console if they are not, discover assets of the platform even when main power is shut off, and/or route TPM commands to the local TPM 121 under typical TPM processes using the ME 107.

The ME data storage 117 contains OEM-configurable parameters and/or setup and configuration parameters such as passwords, network configuration, certificates, and access control lists (ACLs). The ME data storage 117 may also contain other configuration information, such as lists of alerts and system defense policies and the hardware configuration captured by the BIOS 113 at startup. The BIOS 113 stores secured boot procedures that may be utilized in a measured launch environment (MLE).

The memory control 105 is coupled to an input/output control hub (ICH) or peripheral control hub (PCH) 109. The ICH/PCH 109 couples to I/O devices such as keyboards, PCI devices, PCI-Express devices, etc. One of the devices typically coupled to the ICH is a network interface 119 such as a wireless (e.g., WLAN) or wired (e.g., Ethernet) connection.

In addition to the ME being able to run on auxiliary power in some embodiments, the BIOS 113, ME firmware 115, ME data storage 117, TPM 121 and/or the network connection 119 also run on auxiliary power. Additionally, portions, or the entirety, of the ICH/PCH 109 are able to run on auxiliary power.

Additionally, a TPM 121 may be included in the computer 101. In an embodiment, TPM 121 is defined by the Trusted Computing Group (TCG) in the TCG TPM Specification, Version 1.2. The TPM 121 stores cryptographic keys and hashes of software and policies. The TPM 121 provides a repository for measurements and the mechanisms to make use of the measurements. The system makes use of the measurements to both report the current platform configuration and to provide long-term protection of sensitive information. The TPM 121 stores measurements in Platform Configuration Registers (PCRs). PCRs provide a storage area that allows an unlimited number of measurements in a fixed amount of space. They provide this feature by an inherent property of cryptographic hashes. Outside entities never write directly to a PCR register, they "extend" PCR contents. The extend operation takes the current value of the PCR, appends the new value, performs a cryptographic hash on the combined value, and the hash result is the new PCR value. One of the properties of cryptographic hashes is that they are order dependent. This means hashing A then B produces a different result from hashing B then A. This ordering property allows the PCR contents to indicate the order of measurements.

As hinted at earlier, the TPM 121 offers facilities for the secure generation of cryptographic keys, and limitation of their use, in addition to a hardware pseudo-random number generator. It also includes capabilities such as remote attestation and sealed storage. The TPM 121 may also be used to authenticate hardware devices. Since each TPM 121 has a unique and secret RSA key burned in as it is produced, it is capable of performing platform authentication. For example, it can be used to verify that a system seeking access to the TPM 121 is the expected system.

Other components of the computer 101 are not shown. For example, the computer 101 may include Random Access Memory (RAM) coupled to the memory controller, a graphics processor, large non-volatile storage (mechanical or solid state), etc. In some embodiments, the large non-volatile storage (or other non-volatile storage) holds launch control policies that define the trusted platform's elements. These policies are written, for example, by an OEM or VAR and reside in a protect location. A hash of these polices is stored in the TPM 121 and verified during system boot. A1

Typically, computers that support trusted execution have a portion of address space dedicated to the local TPM 121 called the TPM decode space. For example, in some embodiments, this address space resides in the Memory Mapped I/O (MMIO) range starting from 0xFED40000 to 0xFED4FFFF (inclusive). Typically, all accesses to this range are forwarded to the TPM 121. The host software running on the computer 101 forms commands according to the formats defined in TCG (Trusted Computing Group) standards. The commands are executed by issuing read and write commands to registers located in this range. In essence, the software prepares the command package, writes to the payload register(s) in this range, and writes values to the command registers. For example, a driver write commands to a standard TPM memory address (e.g., 0xFED4XXXX), which is captured by an MMIO trap and then delivered to the TPM 121.

Unfortunately, the use of a local TPM, such as TPM 121 may have drawbacks. One of the potential drawbacks is that data encrypted by any program utilizing the TPM 121 may become inaccessible or unrecoverable if any of the following occurs: a) the password associated with the TPM is lost which renders the encrypted data inaccessible; b) a drive failure that contains encrypted data; and/or c) the platform may fail and any data associated with non-migratable keys will be lost. Additionally, if the TPM's 121 ownership is transferred it may open encrypted data to those that were not intended to have access.

For platforms that either do not have the optional local TPM 121 or chose not to use the local TPM 121, a management console 123 and/or TPM server 125 may be used in place of the local TMP 121. The management console 123 is typically used by an administrator to remotely manage the platform 101 and may be a remote computer such as a server. In some embodiments, this is done utilizing Intel® Active Management Technology (AMT). Additionally, when serving as a potential "remote" TPM the management console may 123 include a packet storage 129 to store TPM network packet requests from the platform and routing information storage 131 to store information on what computer 101 made the request and what TPM server 125 that has been chosen to handle the request. For example, a record in the routing information storage 131 may include one or more of the following: a field for packet storage location, time of the request; the time that the packet was received; the time the received packet was processed (either sent to a TPM server or handled internally); an identification of the TPM server that the received packet was sent to (if sent); and/or the identification of the requesting platform. In some embodiments, the management console 123 includes a TPM 133. The management console also includes routing logic (either hardware, software, or firmware) that routes TPM network packets to the appropriate TPM (local or on another server) and back to the requesting platform. The communication channel between the network interface 119 and the management console 123 is typically protected by using SSL/IPSEC or other secure protocols. In addition, the communication channel may also be routed using TCP/IP or natively over Ethernet (suitable for a data center). While not shown, the management console 123 and TPM server 125 also include network interfaces, CPU core(s), etc. The management console 123 also includes functionality for an administrator to configure or receive information from one or both of the TPM server 125 and platform 101 remotely.

The TPM server 125 is coupled to the management console 123 and contains at least one TPM 127 to process requests forwarded by the management console 123. In some embodiments, the computer 101 interacts with the TPM server 125 without the intervention of a management console 123. There may be more than one TPM server 125 available for the management console 123 to interact with. Similarly, the computer 101 may interact with more than one management console 123 depending on how it has been provisioned (what it trusts, etc.). While not shown, the management console 123 and TPM server 125 also include network interfaces, CPU core(s), etc.

Processing systems that may utilize the above include embedded information technology (EIT) that supports system management. For instance, an EIT platform may support verified boot using Intel® TXT and capabilities of a TPM. In addition, a virtual machine (VM) in the platform may make use of core capabilities of a TPM. Such a VM may run a user OS such as Microsoft® Windows Vista™, for example. However, a conventional platform may be unable to share a hardware TPM among multiple VMs while maintaining security guarantees of the TPM.

Figure 2:
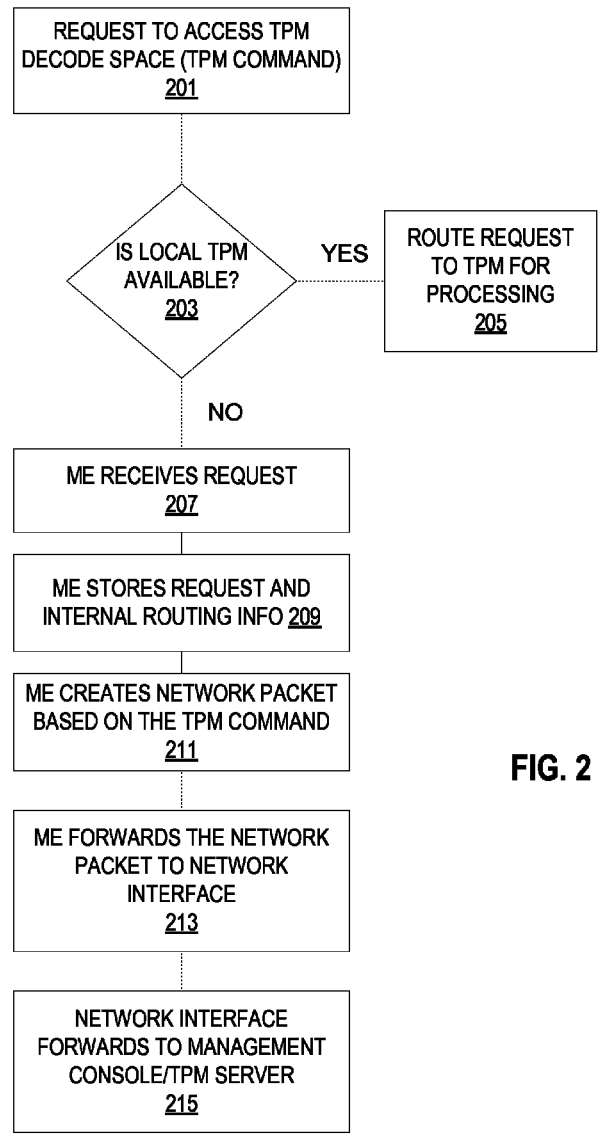
FIG. 2 illustrates an embodiment of a method of a computer creating a TPM command based packet.

FIG. 2 illustrates an embodiment of a method of a computer, such as computer 101, creating a TPM command based packet. At 201 a request is made by a software program running on the computer to access the TPM decode space. This request may be in the form of a TPM command.

At 203, a determination is made of if there is a local TPM available. The availability of a local TPM, such as TPM 121 of FIG. 1, may be known by several different ways. In some embodiments, a local TPM is registered with the platform at boot. In this case, the platform knows it has a local TPM that is available (and presumably setup to run in the BIOS). In other embodiments, the local TPM is started after boot and registered with the OS. In other embodiments, the availability of the local TPM is stored in a non-volatile memory (such as BIOS) that is accessible to a ME without the platform having to go through any boot process. For example, the local TPM is known to exist and the appropriate components (such as the ME 107, ME firmware 115, ME data 117, TPM 121, etc.) are powered on (at least partially). If the local TPM is available for use, then the TPM request is routed to the local TPM for processing at 205. In this instance, the request is processed as is normally done.

If the local TPM is not available for use, the ME receives the request at 207. For example, ME 107 would receive the request from the CPU core 107. In some embodiments, the memory controller 105 is responsible for intercepting and routing the request to the ME 107. For example, if the memory controller 105 received an access request for 0xFED40001 it would forward that request to the ME 107 upon a MIMO trap instead of sending it to the local TPM 121. In this scenario, the locations that would normally be associated with the local TPM 121 are instead associated with the ME 107. In other embodiments, the ME 107 itself does the intercepting.

Upon receiving a request, the ME firmware stores at least internal routing information (which CPU core, socket, etc. made the request) at 209. This information may be stored in ME data 117. The ME firmware may additionally store the request itself or its packetized version (detailed below). For example, one or more of the following may be stored: the TPM command request, a packetized version of the TPM command request, the time of the request; the time that the packetized version was sent out; an identification of who the packetized version was sent to (address or name), an identification of who made the request (such as the software program, the core, the socket, etc.), and/or an identification of the request.

A network packet based on the TPM command is created at 211. For example, the ME 107 will execute the ME firmware 115 to create a TPM command packet. In some embodiments, this packet may be a TCP/IP packet with the TPM command at least making up a portion of the TCP/IP payload. Additional payload information may include a TPM server identifier if known. In local networks it may not be a TCP/IP packet.

The ME forwards this created packet to one of the computer's network interfaces at 213. For example, the ME 107 using the ME firmware 115 forwards the TPM network packet to a NIC, WLAN, etc. As indicated above, the network interface needs to know where to send the TPM network packets to (the address of the management console or TPM server). In some embodiments, this information is set up during the provisioning process such as prior to boot. For example, during provisioning the computer is set to allow remote configuration which removes the need for any software to be run on the platform. Typically, these parameters are set up by the administrator under remote configuration.

At 215 the network interface then forwards the TPM network packet to either a management console or TPM server, depending on the implementation utilized, for processing. Accordingly, the original TPM command has been "virtualized" to be processed at a different location.

Figure 3:
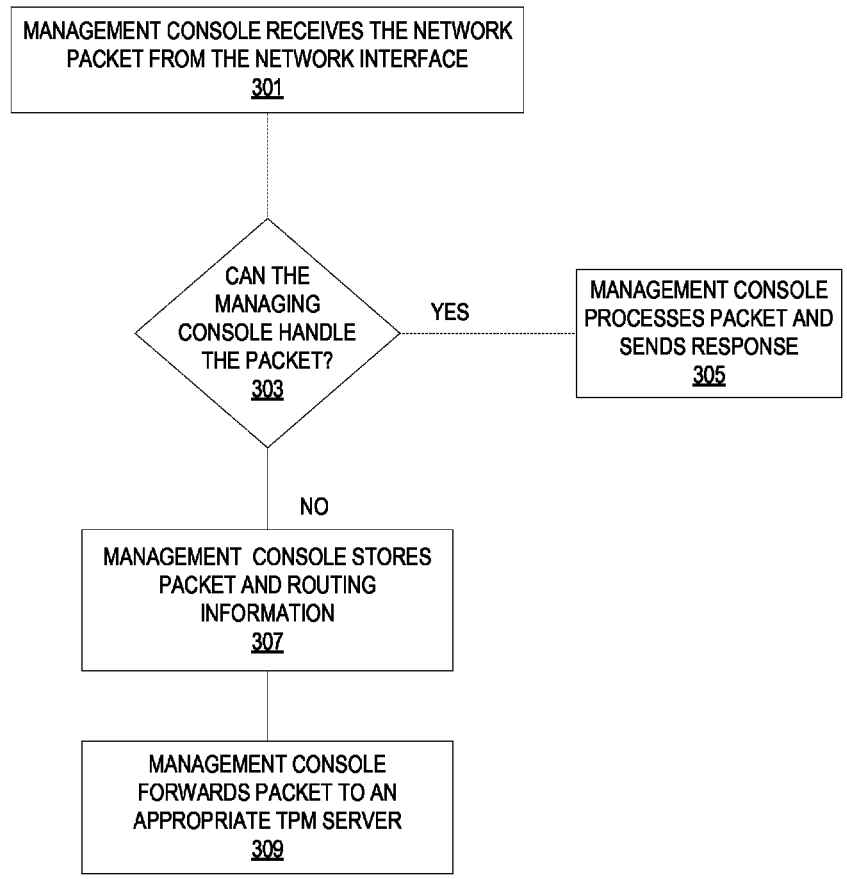
FIG. 3 illustrates an embodiment of a method for handling of incoming TPM network packets by a management console.

FIG. 3 illustrates an embodiment of a method for handling of incoming TPM network packets by a management console. At 301, the management console receives a TPM network packet to be processed from some platform. For example, management console 123 receives a TPM network packet from platform 101 via network interface 119.

The management console then determines if it can handle the TPM network packet at 303. For example, after at least partially decoding the TPM network packet to determine if it contains a TPM command, the management console 123 determines if it has a local TPM 133 to process the request. The management console may also determine if its TPM or TPMs have the bandwidth to handle the request. In some embodiments, the management console stores the packet temporarily in its packet storage and creates an entry in its routing information storage regarding the TPM network packet prior to processing the packet. If it can handle the request, the management console processes the command of the TPM network packet and sends a response back to the platform that made the request at 305.

If the management console cannot handle the packet (no local TPM available), then the management console stores the TPM network packet (for example, in storage 129) and creates an entry in its associated routing information storage (such as storage 131) regarding the TPM network packet at 307. For example, the TPM network packet would be stored in packet storage 129 and an entry detailing who sent the TPM network packet and who it was forwarded to, etc. would be created. While the above has discussed storing the TPM network packet, in some embodiments only a portion of the packet is stored such as the TPM command.

The management console forwards the TPM network packet to an appropriate TPM server at 309. The management console may be configured with the location of the target TPM server based on the MAC address of the sending network interface and/or other static information set by a network administrator. In some embodiments, when forwarding the TPM network packet, the previous routing information (such as TCP/IP) is stripped and replaced with new routing information corresponding to the TPM server chosen to handle the request. Additionally, in some embodiments, an identifier associating the forwarded packet with the original is placed in the forwarded packet. Additionally, an identifier of the management console may be included in the forwarded packet. For example, the location of the packet in packet storage 129 is included in the forwarded packet. This information may assist the management console 123 in associating a response from the TPM server 125 to the forwarded request.

Figure 4:
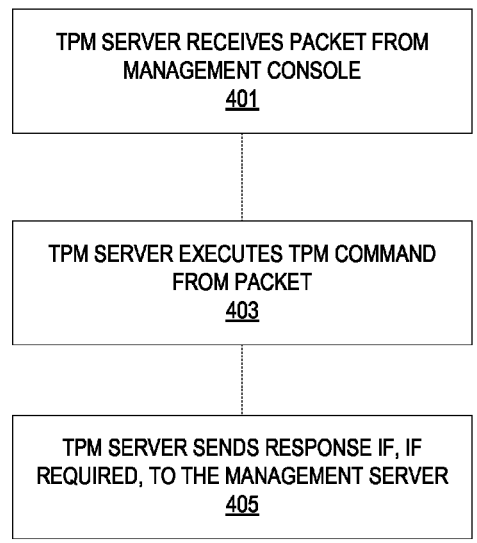
FIG. 4 illustrates an embodiment of a method for handling forwarded TPM network packets by a TPM server.

FIG. 4 illustrates an embodiment of a method for handling forwarded TPM network packets by a TPM server. At 401, a TPM server receives a TPM network packet from a management console. For example TPM server 125 receives a TPM network packet from management console 123, wherein the TPM network packet originated from platform 101.

The TPM server then processes (executes) the TPM command from the TPM network packet in the same manner as if it was local to the platform that made the request at 403. If the TPM command has a response associated with it (return data, status, etc.), the TMP server packetizes a response and sends it to the management server at 405. In some embodiments, the response packet includes an identifier associated with the original request. For example, if the forwarded packet included one or more identifiers, those identifiers are sent back. In some embodiments, the response packet identifies the computer that made the original request.

Figure 5:
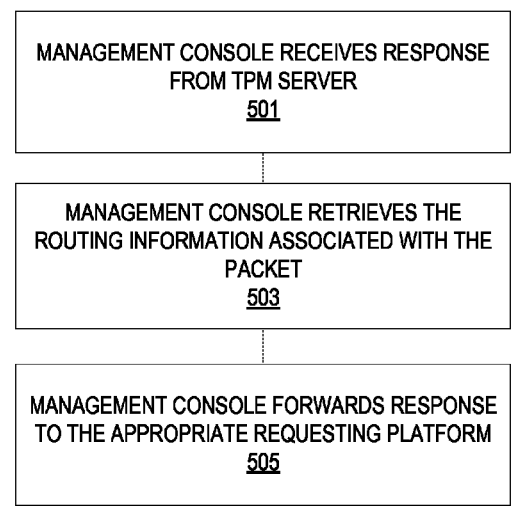
FIG. 5 illustrates an embodiment of a method for processing a response packet by a management console.

FIG. 5 illustrates an embodiment of a method for processing a response packet by a management console. The management console receives a response to a TPM network packet from a TPM server at 501. For example, management console 123 receives a response to a TPM network packet that it forwarded to TPM server 125.

The management console retrieves the routing information associated with the original packet at 503. In some embodiments, the original packet is also retrieved. The response from the TPM is given the source address of the request as its destination address. The management console forwards the response to the appropriate requesting platform at 505.

Figure 6:
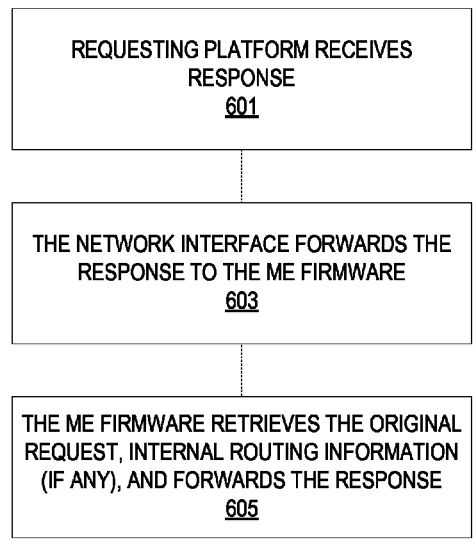
FIG. 6 illustrates an embodiment of a method for a requesting computer to process a response TPM packet.

FIG. 6 illustrates an embodiment of a method for a requesting computer to process a response TPM packet. The requesting platform receives a TPM response at 601. For example, network interface 119 receives the TPM response packet. The network interface forwards this response to the ME firmware at 603.

The ME firmware retrieves the internal routing information (if any) and forwards the response as an internal payload after associating the response to a request that had been made at 605. For example, the ME firmware 115 retrieves the identification of the CPU core 103 that made the request and sends it to that core. The association may be made based on one or more of the saved information, such as the request itself, the identification of who made the request, the identification of the request, etc. From the core's (or software's) prospective the response will appear as a response to the read/write to the TPM decode range. The software that issued the original request will also therefore receive the response. Except for a delay, the software is not aware of the details behind the TPM implementation. In some embodiments, the original request is also retrieved.

While the above description has for the most part utilized the management console as an intermediary between a requesting computer and a TPM server, in some embodiments, the TPM server directly returns a response to the requesting computer if the address of that computer is known (for example, if the address is included in the forwarded packet).

The above provides many advantages. One such advantage is the ability to recover platforms lost because of a misconfigured TPM. If software running on a platform misconfigures or puts the TPM into a bad or invalid state, the platform can be shut down, the TPM recovered and then platform can be rebooted. If the TPM cannot be recovered, another TPM can be activated, provisioned and the management console can be programmed to redirect the requests to the new TPM.

The management console and associated software can be run on the TPM independent of the platform which is using the TPM. In addition, other management/maintenance activities can be performed on the TPM off-line.

Another advantage is that a backup TPM can be used with a primary TPM. If the main TPM (such as a local TPM or primary TPM server) needs to be made off-line, the management console can be programmed to redirect the requests to the backup TPM while the main TPM is down for maintenance.

Additionally, policies or data stored in the TPM is available independent of the location of the platform. For example, if any VM policies are stored in the TPM and the VM is migrated to a new node, the VMM/hypervisor has immediate access to the policies since the TPM is separated from the platform.

Figure 7:
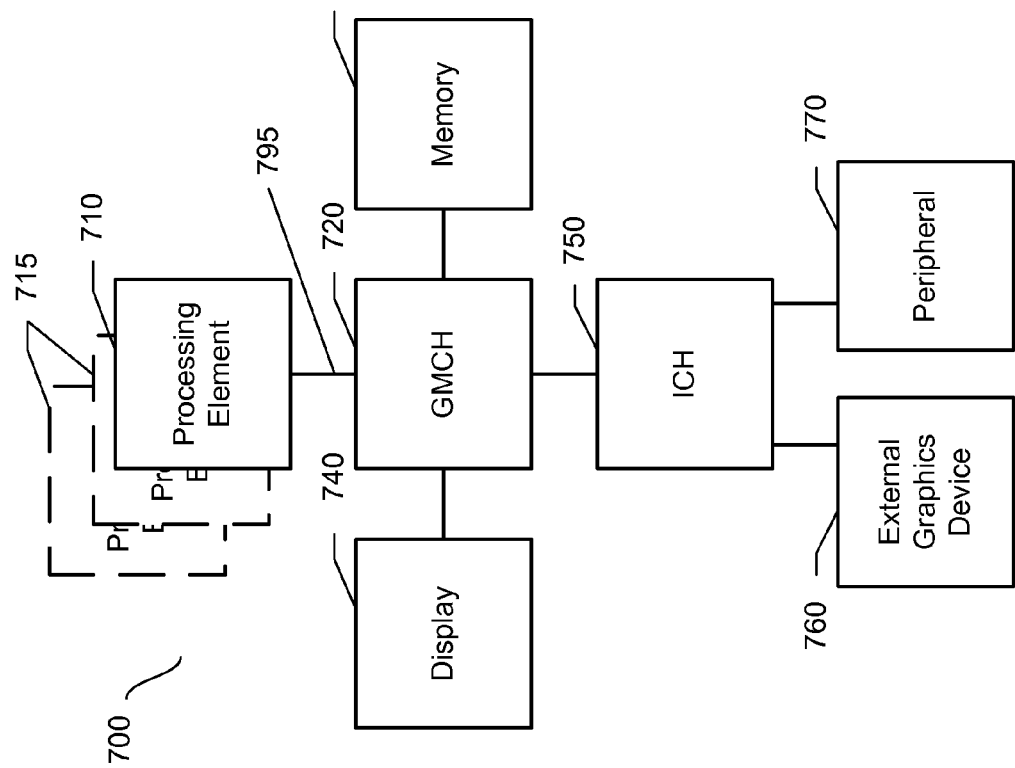
FIG. 7 shows a block diagram of a system in accordance with one embodiment of the present invention.

Referring now to FIG. 7, shown is a block diagram of a system 700 in accordance with one embodiment of the present invention. The system 700 may include one or more processing elements 710, 715, which are coupled to graphics memory controller hub (GMCH) 720. The optional nature of additional processing elements 715 is denoted in FIG. 7 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 7 illustrates that the GMCH 720 may be coupled to a memory that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 740 (such as a flat panel display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device coupled to ICH 750, along with another peripheral device 770.

Alternatively, additional or different processing elements may also be present in the system 700. For example, additional processing element(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processing element. There can be a variety of differences between the physical resources 710, 715 in terms of a spectrum of metrics of merit including architectural, microarchitectural, thermal, power consumption characteristics, and the like. These differences may effectively manifest themselves as asymmetry and heterogeneity amongst the processing elements 710, 715. For at least one embodiment, the various processing elements 710, 715 may reside in the same die package.

Figure 8:
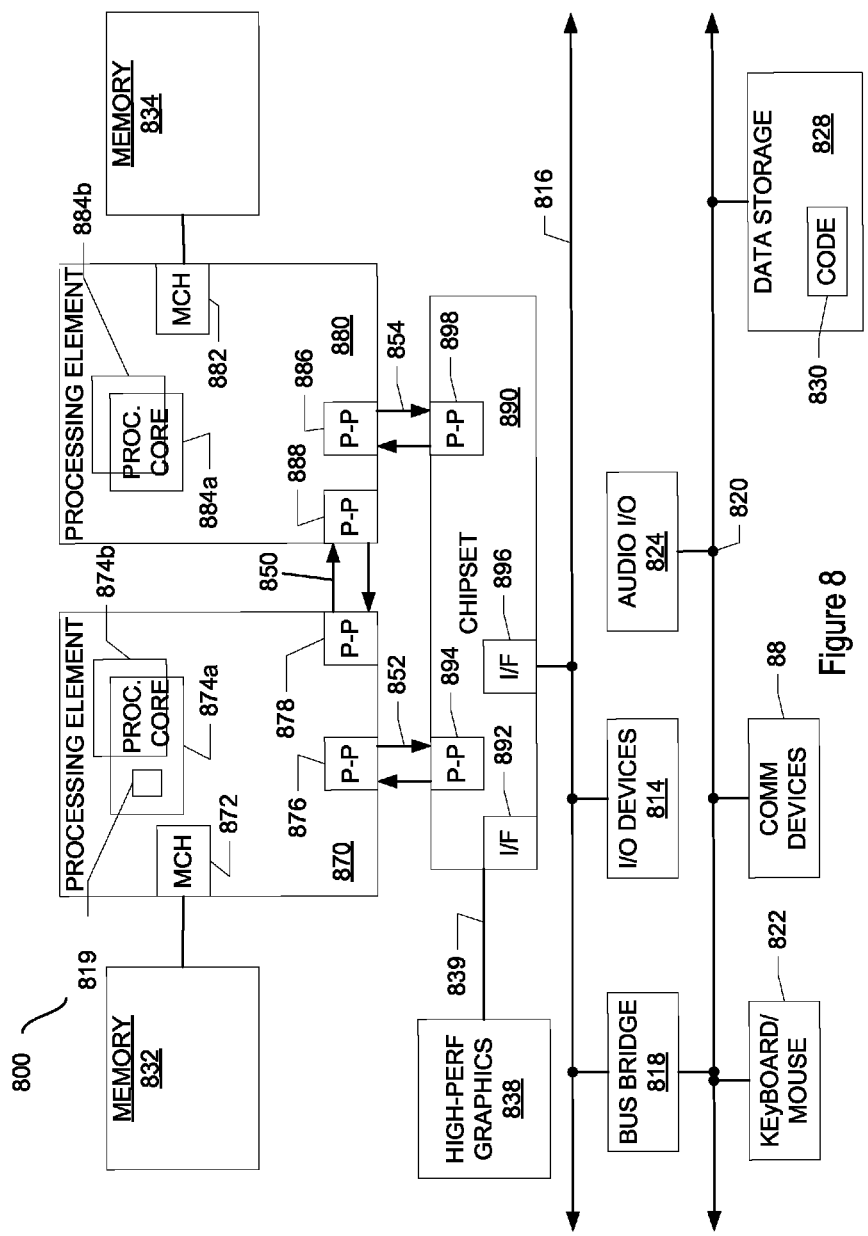
FIG. 8 shows a block diagram of a system in accordance with an embodiment of the present invention.

Referring now to FIG. 8, shown is a block diagram of a second system 800 in accordance with an embodiment of the present invention. As shown in FIG. 8, multiprocessor system 800 is a point-to-point interconnect system, and includes a first processing element 870 and a second processing element 880 coupled via a point-to-point interconnect 850. As shown in FIG. 8, each of processing elements 870 and 880 may be multicore processors, including first and second processor cores (i.e., processor cores 874a and 874b and processor cores 884a and 884b).

Alternatively, one or more of processing elements 870, 880 may be an element other than a processor, such as an accelerator or a field programmable gate array.

While shown with only two processing elements 870, 880, it is to be understood that the scope of the present invention is not so limited. In other embodiments, one or more additional processing elements may be present in a given processor.

First processing element 870 may further include a memory controller hub (MCH) 872 and point-to-point (P-P) interfaces 876 and 878. Similarly, second processing element 880 may include a MCH 882 and P-P interfaces 886 and 888. Processors 870, 880 may exchange data via a point-to-point (PtP) interface 850 using PtP interface circuits 878, 888. As shown in FIG. 8, MCH's 872 and 882 couple the processors to respective memories, namely a memory 832 and a memory 834, which may be portions of main memory locally attached to the respective processors.

Processors 870, 880 may each exchange data with a chipset 890 via individual PtP interfaces 852, 854 using point to point interface circuits 876, 894, 886, 898. Chipset 890 may also exchange data with a high-performance graphics circuit 838 via a high-performance graphics interface 839. Embodiments of the invention may be located within any processor having any number of processing cores, or within each of the PtP bus agents of FIG. 8. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 870 and second processing element 880 may be coupled to a chipset 890 via P-P interconnects 876, 886 and 884, respectively. As shown in FIG. 8, chipset 890 includes P-P interfaces 894 and 898. Furthermore, chipset 890 includes an interface 892 to couple chipset 890 with a high performance graphics engine 838. In one embodiment, bus 839 may be used to couple graphics engine 838 to chipset 890. Alternately, a point-to-point interconnect may couple these components.

In turn, chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard/mouse 822, communication devices 888 and a data storage unit 828 such as a disk drive or other mass storage device which may include code 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
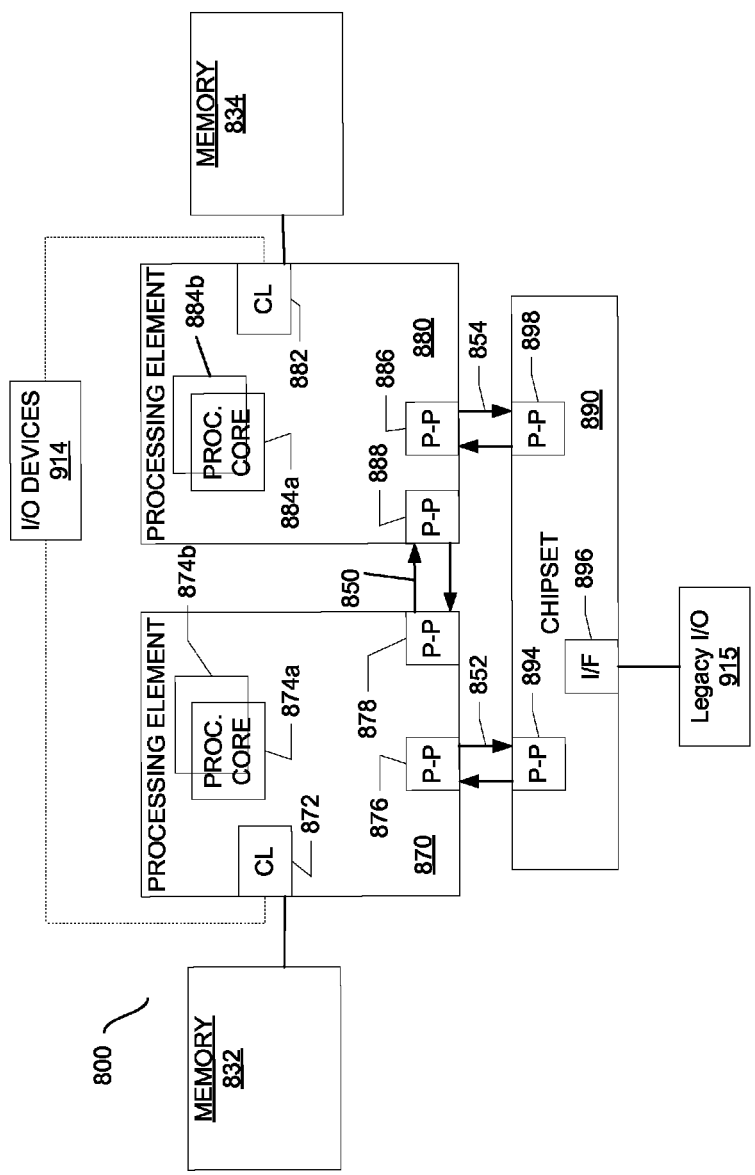
FIG. 9 shows a block diagram of a system in accordance with an embodiment of the present invention.

Referring now to FIG. 9, shown is a block diagram of a third system 900 in accordance with an embodiment of the present invention. Like elements in FIGS. 6 and 7 bear like reference numerals, and certain aspects of FIG. 6 have been omitted from FIG. 7 in order to avoid obscuring other aspects of FIG. 7.

FIG. 9 illustrates that the processing elements 870, 880 may include integrated memory and I/O control logic ("CL") 872 and 882, respectively. For at least one embodiment, the CL 872, 882 may include memory controller hub logic (MCH) such as that described above in connection with FIGS. 7 and 8. In addition. CL 872, 882 may also include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 830 illustrated in FIG. 8, may be applied to input data to perform the functions described herein and generate output information. Accordingly, embodiments of the invention also include machine-readable media containing instructions for performing the operations embodiments of the invention or containing design data, such as HDL, which defines structures, circuits, apparatuses, processors and/or system features described herein. Such embodiments may also be referred to as program products.

Such machine-readable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

The invention claimed is:

1. An apparatus comprising:
a die;
a central processing unit (CPU) core on the die and including hardware, the CPU core to execute a software program;
a memory controller coupled to the CPU core, the memory controller to intercept a trusted platform module (TPM) command that is to have been requested by the software program in a memory mapped input/output (MMIO) trap;
a local TPM that is at least one of misconfigured and disabled, wherein the local TPM would process the TPM command if it was not misconfigured and enabled;
a manageability engine coupled to the CPU core, the manageability engine including a processor that includes at least some hardware, the manageability engine to receive the TPM command from the memory controller and to process the TPM command by at least creating a TPM network packet; and
a network interface coupled to the manageability engine to transmit the TPM network packet to a remote TPM that is external to the apparatus for processing.

2. The apparatus of claim 1, wherein the network interface is a wireless local area network (WLAN) connection.

3. The apparatus of claim 1, wherein the network interface is a wired connection.

4. The apparatus of claim 1, wherein the manageability engine comprises a baseboard management controller (BMC).

5. The apparatus of claim 1, wherein the TPM command requested by the software program is to have attempted to access a register in the memory mapped input/output (MMIO) address range of 0xFED4000 to 0xFED4FFFF.

6. The apparatus of claim 1, wherein the manageability engine is included in the memory controller.

7. A management console comprising:
at least one core on a die;
a network interface coupled with the at least one core to receive a trusted platform module (TPM) network packet from a computer, the TPM network packet associated with a TPM command;
a semiconductor storage device to store:
TPM network packet information to identify the TPM network packet; and
routing information to identify the computer from which the TPM network packet was received and a TPM server that is to process the TPM network packet;
routing logic to route the TPM network packet to the TPM server, and then to route a response from the TPM server corresponding to the TPM network packet to the computer; and
logic to configure the computer remotely and allow remote management of the computer by an administrator.

8. The management console of claim 7, wherein the management console is to select the TPM server from a plurality of TPM servers.

* * * * *